United States Patent
Hebbar et al.

(10) Patent No.: US 9,912,699 B1
(45) Date of Patent: Mar. 6, 2018

(54) SELECTIVELY APPLYING INTERNET PROTOCOL SECURITY (IPSEC) ENCRYPTION BASED ON APPLICATION LAYER INFORMATION

(71) Applicant: Juniper Networks, Inc., Sunnyvale, CA (US)

(72) Inventors: Mithun Hebbar, Bangalore (IN); Vijay Anand, Bangalore (IN)

(73) Assignee: Juniper Networks, Inc., Sunnyvale, CA (US)

( * ) Notice: Subject to any disclaimer, the term of this patent is extended or adjusted under 35 U.S.C. 154(b) by 136 days.

(21) Appl. No.: 14/984,745

(22) Filed: Dec. 30, 2015

(51) Int. Cl.
*G06F 21/00* (2013.01)
*H04L 29/06* (2006.01)
*H04L 29/08* (2006.01)
*H04L 12/721* (2013.01)

(52) U.S. Cl.
CPC .............. *H04L 63/20* (2013.01); *H04L 45/38* (2013.01); *H04L 69/326* (2013.01); *H04L 69/329* (2013.01)

(58) Field of Classification Search
CPC ....................................................... H04L 63/20
See application file for complete search history.

(56) References Cited

U.S. PATENT DOCUMENTS

| | | | |
|---|---|---|---|
| 7,028,332 B1* | 4/2006 | Jason, Jr. ............ | H04L 63/0227 713/151 |
| 2007/0011448 A1* | 1/2007 | Chhabra ............... | H04L 63/164 713/151 |
| 2011/0252228 A1* | 10/2011 | Chang .................. | H04L 9/0844 713/153 |
| 2012/0033663 A1* | 2/2012 | Guichard ............... | H04L 45/02 370/389 |
| 2014/0123269 A1* | 5/2014 | Drihem ............... | H04L 63/0236 726/15 |
| 2014/0317738 A1* | 10/2014 | Be'ery .................... | H04L 63/14 726/23 |

FOREIGN PATENT DOCUMENTS

CN 101729544 B 3/2013

OTHER PUBLICATIONS

Lu et al., "IPSec Implementation on Xilinx Virtex-II Pro FPGA and Its Application," http://www.researchgate.net/publication/220952535, Jan. 2005, 8 pages.

(Continued)

*Primary Examiner* — Morshed Mehedi
(74) *Attorney, Agent, or Firm* — Harrity & Harrity, LLP (57) ABSTRACT

A network device may receive a packet flow, and may identify an application associated with the packet flow. The network device may determine that packets associated with the application are not to be encrypted using a security protocol. The network device may store a rule that indicates that the packets are not to be encrypted using the security protocol based on determining that the packets are not to be encrypted using the security protocol. The rule may include network layer information or transport layer information associated with the packet flow, and may exclude application layer information associated with the packet flow. The network device may transmit, based on the rule, the packets without using the security protocol to encrypt the packets.

20 Claims, 6 Drawing Sheets

(56) References Cited

OTHER PUBLICATIONS

Faienza et al., "IPsec Intrusion Detection Analysis: Using data from an Ericsson Ethernet Interface Board," https://www.researchgate.net/publication/278007882_IPsec_Intrusion_Detection_Analysis_Using_data_from_an_Ericsson_Ethernet_Interface_Board, Mar. 20, 2008, 107 pages.
Sandvine, "Internet Traffic Classification," https://www.sandvine.com/downloads/general/sandvine-technology-showcases/traffic-classification-identifying-and-measuring-internet-traffic.pdf, Nov. 4, 2014, 17 pages.
Wikipedia, "IPsec," https://en.wikipedia.org/wiki/IPsec, Dec. 30, 2015, 10 pages.
Wikipedia, "Deep packet inspection," https://en.wikipedia.org/wiki/Deep_packet_inspection, Dec. 23, 2015, 13 pages.
Maughan et al., "Internet Security Association and Key Management Protocol (ISAKMP)," https://tools.ietf.org/html/rfc2408, Nov. 1998, 86 pages.
Wikipedia, "Transport Layer Security," https://en.wikipedia.org/wiki/Transport_Layer_Security, Dec. 30, 2015, 27 pages.
Wikipedia, "Secure Shell," https://en.wikipedia.org/wiki/Secure_Shell, Dec. 2, 2015, 10 pages.

\* cited by examiner

SELECTIVELY APPLYING INTERNET PROTOCOL SECURITY (IPSEC) ENCRYPTION BASED ON APPLICATION LAYER INFORMATION

BACKGROUND

Internet Protocol Security (IPsec) is a protocol suite for securing Internet Protocol (IP) communications by authenticating and encrypting each IP packet of a communication session. IPsec includes protocols for establishing mutual authentication between devices at the beginning of the communication session and negotiation of cryptographic keys to be used during the communication session. IPsec can be used to protect data flows between a pair of hosts (e.g., host-to-host), between a pair of security gateways (e.g., network-to-network), between a security gateway and a host (e.g., network-to-host), or the like. IPsec operates in the Internet Layer (e.g., the network layer) of the Internet protocol suite.

SUMMARY

According to some possible implementations, a device may include one or more processors to receive one or more packets associated with a flow. The one or more processors may determine to protect the one or more packets, associated with the flow, using Internet protocol security (IPsec). The one or more processors may identify an application associated with the flow. The one or more processors may determine that network traffic, associated with the application, is not to be protected using IPsec after determining to protect the one or more packets using IPsec. The one or more processors may store a rule that indicates that the network traffic, associated with the flow, is not to be protected using IPsec based on determining that the network traffic is not to be protected using IPsec. The one or more processors may transmit, to another device, a message indicating that the network traffic, associated with the flow, is not to be protected using IPsec based on determining that the network traffic is not to be protected using IPsec. The one or more processors may transmit, to the other device, the network traffic, associated with the flow, without using IPsec protection.

According to some possible implementations, a non-transitory computer-readable medium may store one or more instructions that, when executed by one or more processors, cause the one or more processors to receive one or more packets associated with a flow. The one or more instructions may cause the one or more processors to determine application layer information included in the one or more packets. The one or more instructions may cause the one or more processors to identify, based on the application layer information, an application associated with the flow. The one or more instructions may cause the one or more processors to determine that network traffic, associated with the application, is not to be protected using a network security protocol. The one or more instructions may cause the one or more processors to store a rule that indicates that the network traffic is not to be protected using the network security protocol based on determining that the network traffic is not to be protected using the network security protocol. The rule may include network layer information and/or transport layer information that identifies the flow, and the rule may not include the application layer information. The one or more instructions may cause the one or more processors to transmit, based on the rule, the network traffic without using the network security protocol to protect the network traffic.

According to some possible implementations, a method may include receiving, by a network device, a packet flow. The method may include identifying, by the network device, an application associated with the packet flow. The method may include determining, by the network device, that packets associated with the application are not to be encrypted using a security protocol. The method may include storing, by the network device, a rule that indicates that the packets are not to be encrypted using the security protocol based on determining that the packets are not to be encrypted using the security protocol. The rule may include network layer information or transport layer information associated with the packet flow, and may exclude application layer information associated with the packet flow. The method may include transmitting, by the network device and based on the rule, the packets without using the security protocol to encrypt the packets.

DETAILED DESCRIPTION

The following detailed description of example implementations refers to the accompanying drawings. The same reference numbers in different drawings may identify the same or similar elements.

Internet Protocol Security (IPsec) is a protocol suite for securing Internet Protocol (IP) communications by authenticating and encrypting IP packets. IPsec operates based on network layer information and/or transport layer information (e.g., information associated with the Internet Layer and/or the Transport Layer of the Internet protocol suite). For example, an IPsec policy may be used to determine whether to protect (e.g., authenticate, encrypt, etc.) network traffic based on 5-tuple information associated with the network traffic (e.g., a source IP address, a destination IP address, a source port, a destination port, a protocol, etc.), which may be determined based on network layer information and/or transport layer information. IPsec does not use application layer information to determine whether to protect network traffic. Thus, IPsec policies typically provide all-or-nothing protection to applications without the ability to distinguish between applications based on application-specific security policies.

Other security protocols, such as Transport Layer Security (TLS), Secure Shell (SSH), or the like, may protect network traffic based on application layer information. However, these protocols have more security vulnerabilities than IPsec. Implementations described herein permit IPsec policies to be used to protect network traffic based on application layer information. In this way, the security of the network traffic may be increased via the use of IPsec, while also permitting more control over the type of network traffic that is protected. This provides increased security for more sensitive applications, and also conserves computing resources (e.g., processing resources, memory resources, etc.) and increases network performance (e.g., throughput, latency, etc.) for less sensitive applications.

Figure 1A:
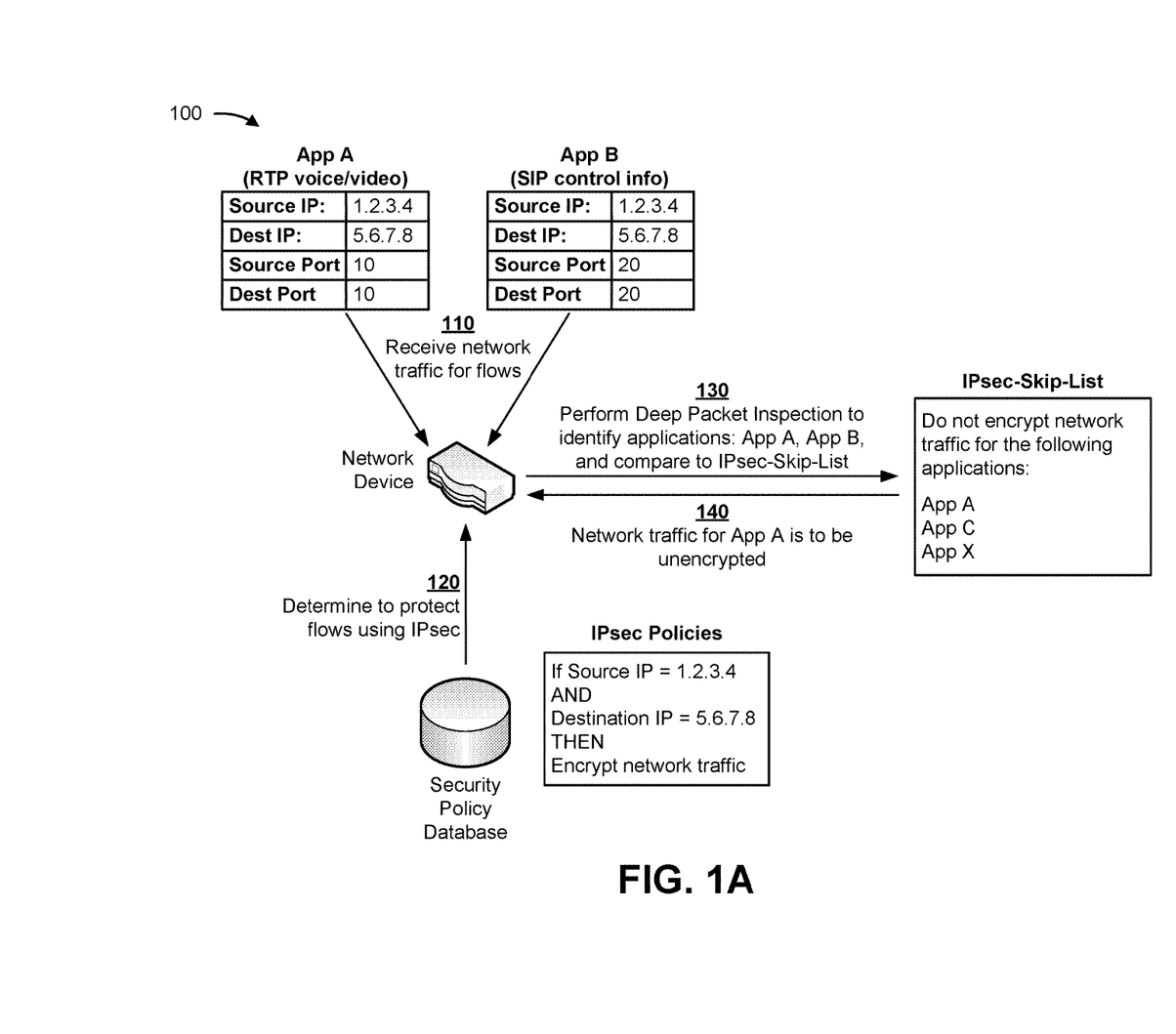
FIGS. 1A-1C are diagrams of an overview of an example implementation described herein.
Figure 1B:
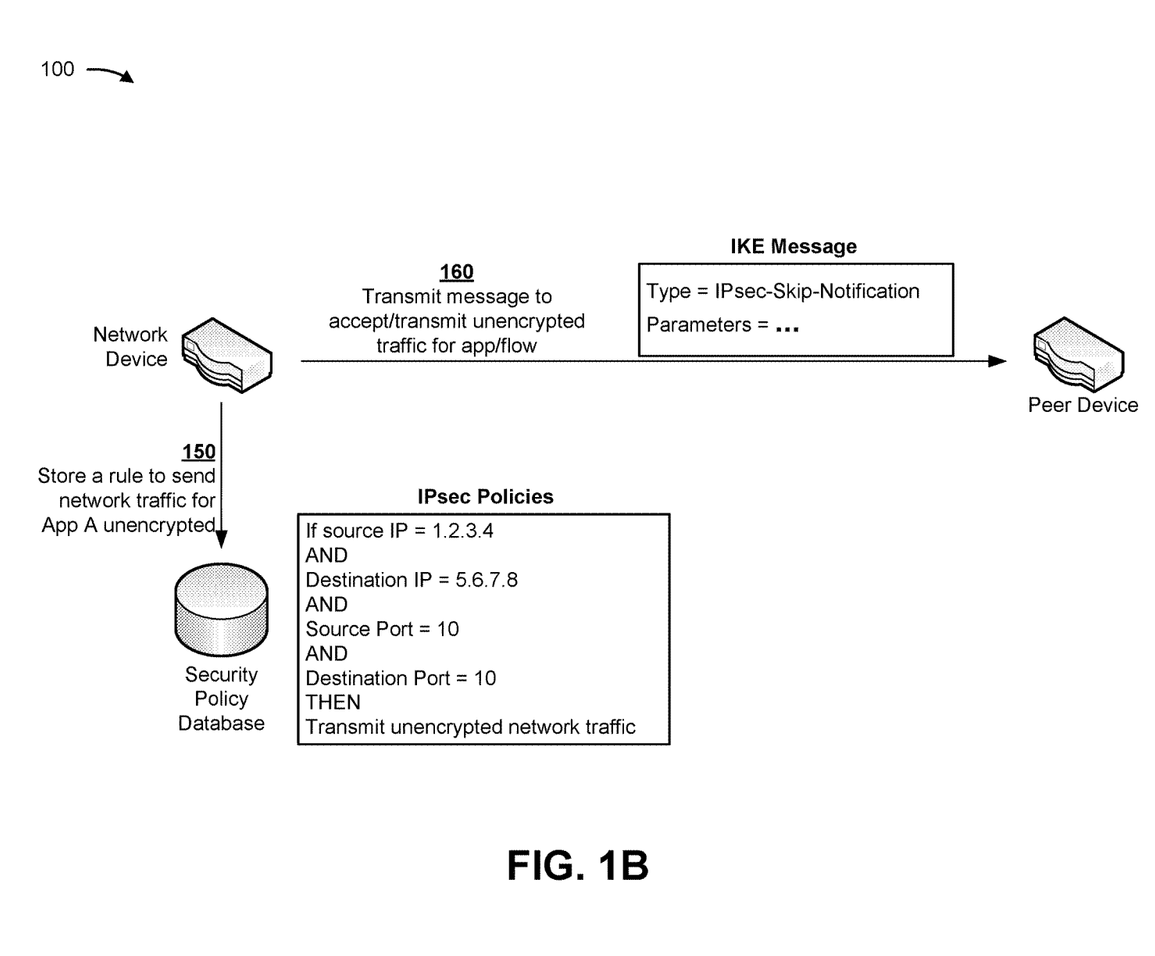
Figure 1C:
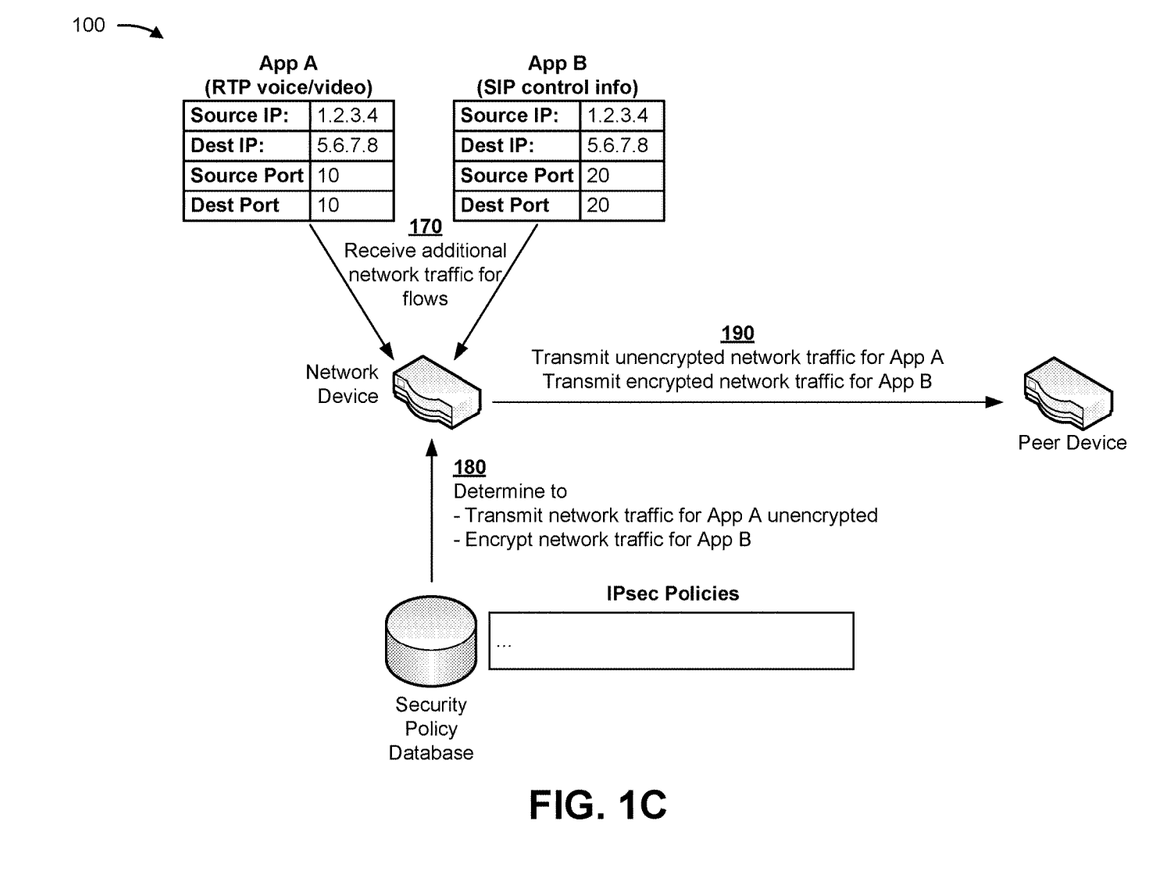

FIGS. 1A-1C are diagrams of an overview of an example implementation 100 described herein. As shown in FIG. 1A, and by reference number 110, assume that a network device (e.g., a router, a gateway, a firewall, etc.) receives network traffic for two flows. The first flow is associated with a first application, shown as App A, which uses real-time transport protocol (RTP) for a voice and/or video communication session. The second flow is associated with a second application, shown as App B, which uses session initiation protocol (SIP) to provide control information for the voice and/or video communication session.

A user may want to use IPsec to encrypt the control information associated with App B to prevent tampering with the communication session. The user may also want to send voice and/or video data, associated with App A, unencrypted to reduce processing and increase network performance for the voice and/or video data. However, IPsec security policies use network layer information and/or transport layer information (e.g., 5-tuple information), not application layer information, to determine whether to encrypt network traffic. For example, an IPsec security policy may use a source IP address (e.g., shown as 1.2.3.4 for App A and App B), a destination IP address (e.g., shown as 5.6.7.8 for App A and App B), a source port (e.g., shown as 10 for App A and 20 for App B), a destination port (e.g., shown as 10 for App A and 20 for App B), or other network layer or transport layer information to determine whether to encrypt network traffic. However, this network layer or transport layer information does not permit an IPsec policy to distinguish between different applications, such as App A and App B.

As shown by reference number 120, the network device may use an IPsec policy (e.g., a rule) to determine that the two flows are to be protected (e.g., authenticated, encrypted, etc.) using IPsec. For example, the network device may access a security policy database that stores IPsec policies. As shown by reference number 130, the network device may then analyze the flows to identify the applications associated with the flows, and to determine whether to protect network traffic for the flows using IPsec. In some implementations, the network device may transmit encrypted network traffic for the flows until the network device determines that the network traffic is to be unencrypted, thereby reducing latency. Additional details regarding selectively applying IPsec encryption based on application layer information are described elsewhere herein.

For example, and as shown, the network device may perform a deep packet inspection to determine that the first flow includes network traffic for App A and the second flow includes network traffic for App B. The network device may then use a list that identifies applications that are to be unencrypted (shown as "IPsec-Skip-List") to determine whether to encrypt network traffic associated with the flows. As shown, assume that the list indicates that network traffic associated with App A, App C, and App X is to be transmitted unencrypted. As shown by reference number 140, based on this information, the network device determines that network traffic for App A is to be unencrypted.

As shown in FIG. 1B, and by reference number 150, the network device may store a rule that indicates that network traffic for App A is to be unencrypted. For example, the network device may store the rule in the security policy database. The rule may indicate whether to apply IPsec based on network layer information and/or transport layer information associated with App A. For example, the network device may determine that App A is associated with particular network layer information and/or transport layer information, such as a source IP address of 1.2.3.4, a destination IP address of 5.6.7.8, a source port of 10, a destination port of 10, or other network layer or transport layer information. In this way, the network device may correlate application layer information and network layer or transport layer information, and may store a rule that permits IPsec to be applied to selectively protect different applications based on network layer information and/or transport layer information associated with those applications.

As shown by reference number 160, the network device may transmit a message to instruct a peer device (e.g., a router, a gateway, an endpoint device, etc.) to accept unencrypted network traffic for App A and/or to transmit unencrypted network traffic for App A. For example, the network device may transmit an Internet Key Exchange (IKE) message to the peer device. The IKE message may indicate a type of the IKE message (e.g., a type that indicates that network traffic is to be accepted and/or transmitted unencrypted, shown as an "IPsec-Skip-Notification" type), and may include parameters of the flow for which network traffic is to be unencrypted. For example, the parameters may include network layer information and/or transport layer information for the flow. The peer device may store an IPsec policy (e.g., a rule) that indicates that network traffic for the flow (e.g., associated with App A) is to be unencrypted, in a similar manner as described above in connection with reference number 150. In this way, the network device and the peer device may negotiate a security policy for network traffic based on application layer information associated with the network traffic.

As shown in FIG. 1C, and by reference number 170, assume that the network device receives additional network traffic for the two flows (e.g., associated with App A and App B) after storing the rule that indicates that network traffic for App A is to be unencrypted. As shown by reference number 180, the network device may determine to transmit network traffic for App A unencrypted, and may determine to encrypt network traffic for App B. For example, the network device may access the security policy database that stores IPsec policies (e.g., the rules described above in connection with FIGS. 1A and 1B). The IPsec policies may indicate that network traffic for App A is to be unencrypted (e.g., based on network layer information and/or transport layer information corresponding to App A), and that network traffic for App B is to be encrypted (e.g., based on network layer information and/or transport layer information corresponding to App B).

As shown by reference number 190, the network device may transmit, to the peer device, unencrypted network traffic for App A and encrypted network traffic for App B. In this way, the network device can distinguish between applications for the purpose of applying IPsec to network traffic, thereby increasing security of more sensitive applications (such as App B), and also conserving computing resources and increasing network performance for less sensitive applications (such as App A). Furthermore, because the network device has notified the peer device regarding the IPsec policies to be applied to network traffic of the different applications, the peer device can properly process network traffic of the different applications.

As indicated above, FIGS. 1A-1C are provided merely as an example. Other examples are possible and may differ from what was described with regard to FIGS. 1A-1C.

Figure 2:
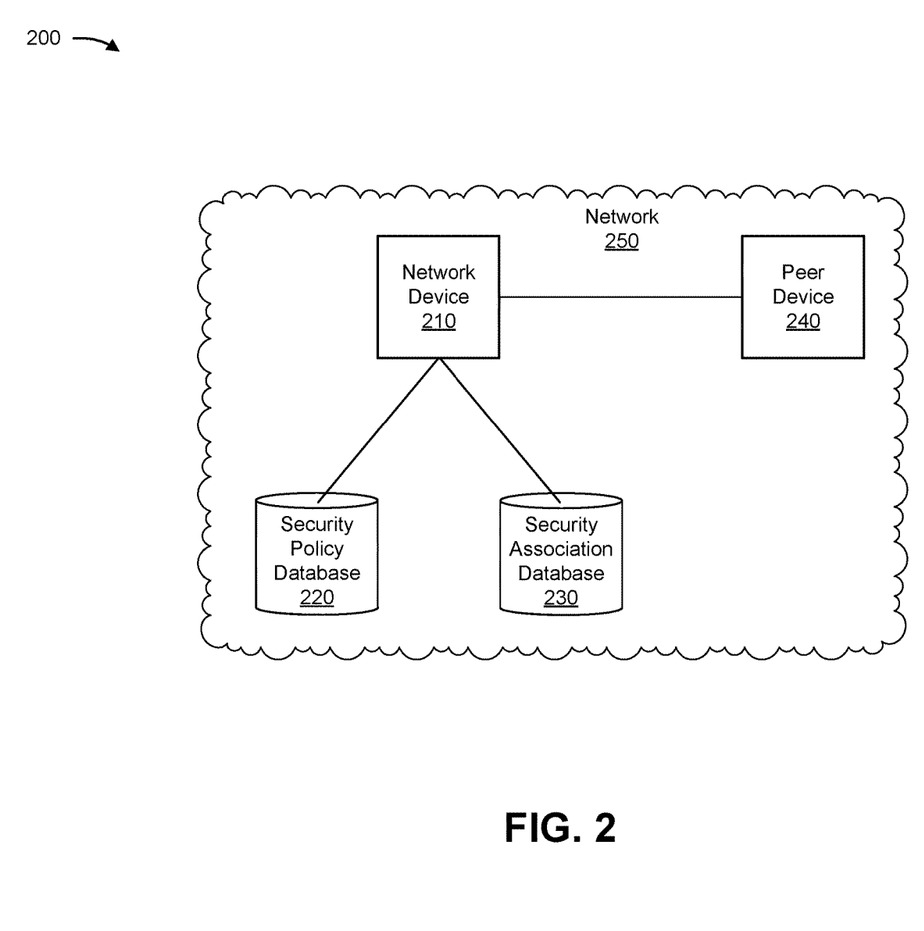
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a network device 210, a security policy database 220, a security association database 230, a peer device 240, and a network 250. Devices of environment 200 may interconnect via wired connections, wireless connections, or a combination of wired and wireless connections.

Network device 210 may include one or more devices (e.g., one or more traffic transfer devices) capable of processing and transferring network traffic between endpoint devices. For example, network device 210 may include a router, a switch, a gateway, a firewall, a hub, a bridge, a reverse proxy device, a server device (e.g., a proxy server, a server executing a virtual machine, etc.), a security device, an intrusion detection device, a load balancer device, or a similar device. Network device 210 may protect network traffic (e.g., via authentication, encryption, etc.) using IPsec. In some implementations, network device 210 may use security policy database 220 and/or security association database 230 to assist with protecting network traffic. Network device 210 may transmit network traffic to and/or receive network traffic from peer device 240.

Security policy database 220 may include one or more devices capable of storing IPsec policies. For example, security policy database 220 may include a memory device, a server device, a memory of network device 210, or the like. Security policy database 220 may be local to or remote from network device 210. Security policy database 220 may store IPsec policies, which may include one or more rules that indicate whether to protect network traffic using IPsec. Network device 210 may use one or more rules stored by security policy database 220 to determine whether to protect network traffic using IPsec.

Security association database 230 may include one or more devices capable of storing security associations for network traffic. For example, security association database 230 may include a memory device, a server device, a memory of network device 210, or the like. Security association database 230 may be local to or remote from network device 210. Security association database 230 may store security associations, which may include shared security parameters to support secure communication between devices (e.g., between network device 210 and peer device 240). For example, a security association may include parameters, such as a cryptographic algorithm to be used to secure network traffic, a network traffic encryption key, or the like. A security association may be applied to network traffic associated with particular network layer information and/or transport layer information, such as a particular source IP address, a particular destination IP address, or the like. Security association database 230 may store information that associates security association parameters and network traffic associated with particular network layer information and/or transport layer information to permit secure communication of the network traffic between network device 210 and peer device 240.

Peer device 240 may include one or more devices capable of receiving and/or providing network traffic. For example, peer device 240 may include a traffic transfer device, such as a router, a switch, a gateway, a firewall, a hub, a bridge, a reverse proxy device, a server device (e.g., a proxy server, a server executing a virtual machine, etc.), a security device, an intrusion detection device, a load balancer device, or a similar device. Additionally, or alternatively, peer device 240 may include an endpoint device that is a source or a destination for network traffic. For example, peer device 240 may include a computer or a similar device. Peer device 240 may receive network traffic from and/or may provide network traffic to network device 210. In some implementations, peer device 240 may include or have access to a security policy database 220 and/or a security association database 230, which may be different than those shown in FIG. 2.

Network 250 may include one or more wired and/or wireless networks. For example, network 250 may include a cellular network (e.g., a long-term evolution (LTE) network, a 3G network, a code division multiple access (CDMA) network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the Internet, a fiber optic-based network, a cloud computing network, or the like, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
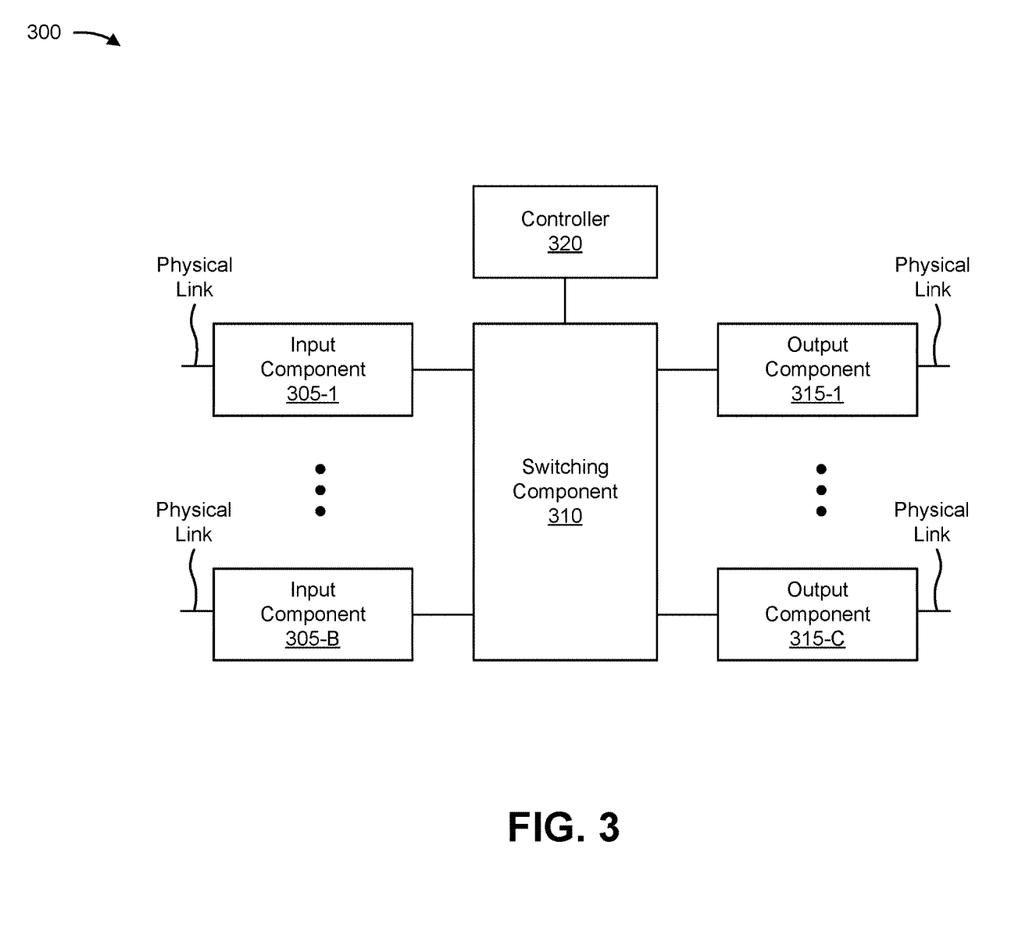
FIG. 3 is a diagram of example components of one or more devices of FIG. 2.

FIG. 3 is a diagram of example components of a device 300. Device 300 may correspond to network device 210 and/or peer device 240. In some implementations, network device 210 and/or peer device 240 may include one or more devices 300 and/or one or more components of device 300. As shown in FIG. 3, device 300 may include a set of input components 305, a switching component 310, a set of output components 315, and a controller 320. In some implementations, components of devices 300 may interconnect via wired connections.

Input component 305 may be a point of attachment for a physical link connected to device 300, and may be a point of entry for incoming traffic (e.g., packets) received by device 300. Input component 305 may process incoming traffic, such as by performing data link layer encapsulation or decapsulation. In some implementations, input component 305 may send and/or receive packets. In some implementations, input component 305 may include an input line card that includes one or more packet processing components (e.g., in the form of integrated circuits), such as one or more interface cards (IFCs), packet forwarding components, line card controller components, input ports, processors, memories, and/or input queues.

Switching component 310 may interconnect input components 305 and output components 315. In some implementations, switching component 310 may be implemented via one or more crossbars, via one or more busses, and/or using shared memory. The shared memory may act as a temporary buffer to store packets from input components 305 before the packets are eventually scheduled for delivery to output components 315. In some implementations, switching component 310 may enable input components 305, output components 315, and/or controller 320 to communicate.

Output component 315 may be a point of attachment for a physical link connected to device 300, and may be a point of exit for outgoing traffic (e.g., packets) transmitted by device 300. Output component 305 may store packets and/or may schedule packets for transmission on output physical links. Output component 315 may support data link layer encapsulation or decapsulation, and/or a variety of higher-level protocols. In some implementations, output component 315 may send packets and/or receive packets. In some implementations, output component 315 may include an output line card that includes one or more packet processing components (e.g., in the form of integrated circuits), such as one or more IFCs, packet forwarding components, line card controller components, output ports, processors, memories, and/or output queues. In some implementations, input component 305 and output component 315 may be implemented by the same set of components (e.g., an input/output component may be a combination of input component 305 and output component 315).

Controller 320 includes a processor in the form of, for example, a central processing unit (CPU), a microprocessor, a field-programmable gate array (FPGA), an application-specific integrated circuit (ASIC), and/or another type of processor that can interpret and/or execute instructions. Controller 320 is implemented in hardware, firmware, or a combination of hardware and software. In some implementations, controller 320 may include one or more processors that can be programmed to perform a function.

In some implementations, controller 320 may include a random access memory (RAM), a read only memory (ROM), and/or another type of dynamic or static storage device (e.g., a flash memory, a magnetic memory, an optical memory, etc.) that stores information and/or instructions for use by controller 320.

In some implementations, controller 320 may communicate with other devices, networks, and/or systems connected to device 300 to exchange information regarding network topology. Controller 320 may create routing tables based on the network topology information, may create forwarding tables based on the routing tables, and may forward the forwarding tables to input components 305 and/or output components 315. Input components 305 and/or output components 315 may use the forwarding tables to perform route lookups for incoming and/or outgoing packets.

Controller 320 may perform one or more processes described herein. Controller 320 may perform these processes in response to executing software instructions stored by a non-transitory computer-readable medium. A computer-readable medium is defined herein as a non-transitory memory device. A memory device includes memory space within a single physical storage device or memory space spread across multiple physical storage devices.

Software instructions may be read into a memory and/or a storage component associated with controller 320 from another computer-readable medium or from another device via a communication interface. When executed, software instructions stored in a memory and/or a storage component associated with controller 320 may cause controller 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

Figure 4:
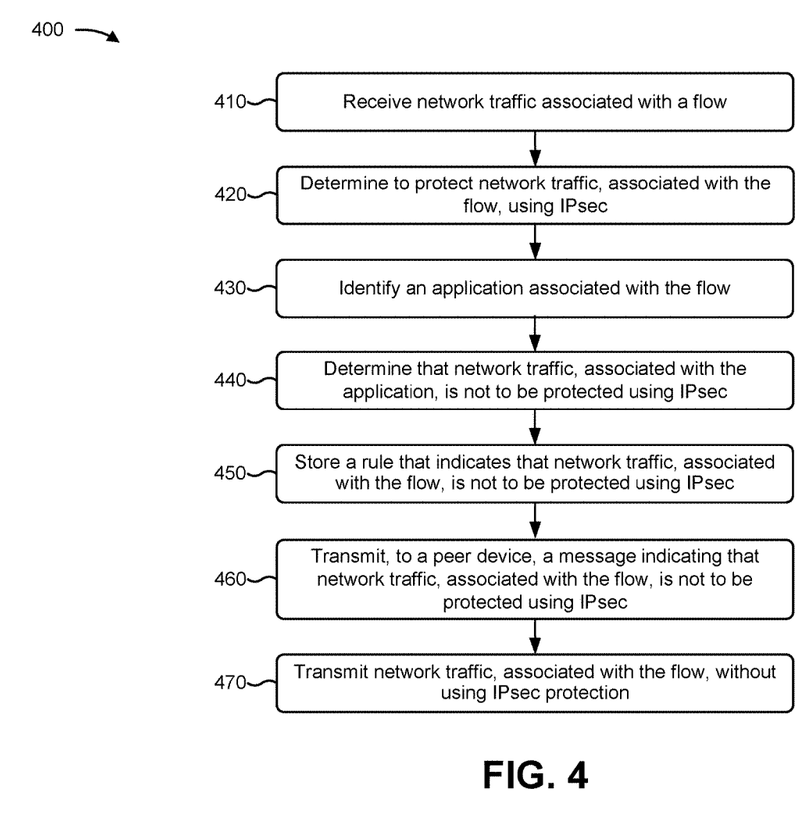
FIG. 4 is a flow chart of an example process for selectively applying IPsec encryption based on application layer information.

FIG. 4 is a flow chart of an example process 400 for selectively applying IPsec encryption based on application layer information. In some implementations, one or more process blocks of FIG. 4 may be performed by network device 210. In some implementations, one or more process blocks of FIG. 4 may be performed by another device or a group of devices separate from or including network device 210, such as peer device 240.

As shown in FIG. 4, process 400 may include receiving network traffic associated with a flow (block 410). For example, network device 210 may receive network traffic associated with a flow (e.g., a network flow, a packet flow, etc.). The network traffic may include one or more packets. As used herein, a packet may refer to a communication structure for communicating information, such as a protocol data unit (PDU), a packet, a frame, a datagram, a segment, a message, a block, a cell, a frame, a subframe, a slot, a symbol, a portion of any of the above, and/or another type of formatted or unformatted unit of data capable of being transmitted via a network.

In some implementations, a flow may refer to network traffic having particular parameters. For example, a flow may be identified based on network layer information and/or transport layer information, such as one or more of a source IP address, a destination IP address, a source port, a destination port, a protocol, or the like. In some implementations, a flow may be identified by a 5-tuple that includes the source IP address, the destination IP address, the source port, the destination port, and the protocol. In some implementations, a flow may be identified using a flow identifier. In some implementations, network device 210 may identify a flow, and may determine whether network traffic, associated with the flow, is to be protected using IPsec, as described below.

As further shown in FIG. 4, process 400 may include determining, whether to protect network traffic, associated with the flow, using IPsec (block 420). For example, network device 210 may determine whether to use IPsec to protect (e.g., authenticate, encrypt, etc.) network traffic associated with the flow. In some implementations, network device 210 may use information stored in security policy database 220 to determine whether to protect network traffic associated with the flow. For example, security policy database 220 may store information that identifies a flow (e.g., using a flow identifier, a 5-tuple, network layer information, transport layer information, a hash of all or part of the 5-tuple, etc.), and may store information that indicates whether the flow is to be protected using IPsec. For example, an IPsec policy (e.g., a rule) stored by security policy database 220 may indicate that network traffic associated with a particular source IP address and a particular destination IP address is to be protected using IPsec.

In some implementations, network device 210 may determine, based on the flow and the IPsec policy, that IPsec is to be applied to the flow (e.g., network traffic associated with the flow). This initial determination to protect the flow using IPsec may be based on network layer information and/or transport layer information associated with the flow, and may ignore application layer information associated with the flow. Network device 210 may later determine not to protect the flow using IPsec (e.g., based on application layer information) after initially determining to protect the flow using IPsec, as described in more detail below.

As further shown in FIG. 4, process 400 may include identifying an application associated with the flow (block 430). For example, network device 210 may identify an application associated with the flow. In some implementations, network device 210 may analyze network traffic (e.g., one or more packets), associated with the flow, to identify an application associated with the flow. For example, network device 210 may analyze the network traffic using deep packet inspection. In some implementations, network device 210 may determine (e.g., may obtain or create) an application identifier that identifies the application associated with the flow. The application identifier may be based on, for example, an application signature associated with the application, application layer information (e.g., layer 7 information) associated with the application, or the like.

In some implementations, network device 210 may analyze packets before transmitting the packets. For example, network device 210 may receive a packet, may make a first determination to protect the packet using IPsec (e.g., as described above), may analyze the packet to identify an application associated with the packet, and may make a second determination not to protect the packet using IPsec (e.g., as described below). If network device 210 makes this second determination prior to transmitting the packet (e.g., to peer device 240), then network device 210 may send the packet unencrypted (e.g., may not protect the packet using IPsec).

However, if network device 210 analyzes packets before transmitting the packets, this may increase packet delay. Thus, in some implementations, network device 210 may make copies of the packets, and may analyze the copies of the packets (e.g., using deep packet inspection). For example, network device 210 may receive a packet, may make a first determination to protect the packet using IPsec (e.g., as described above), may make a copy of the packet, may analyze the copy of the packet to identify an application associated with the packet, and may make a second determination not to protect the packet using IPsec (e.g., as described below). While network device 210 is analyzing the copy of the packet, network device 210 may concurrently (e.g., in parallel) transmit the packet to peer device 240, thereby reducing packet delay.

In some implementations, network device 210 may protect network traffic using IPsec (e.g., may encrypt packets) until the second determination indicates not to protect network traffic, associated with the flow, using IPsec. In this way, network traffic may be securely communicated until network device 210 makes a determination otherwise. When protecting the network traffic using IPsec, network device 210 may use a security association (e.g., stored by security association database 230), associated with the network traffic, to encrypt the network traffic.

In some implementations, when network device 210 copies packets, network device 210 may prevent further packets from being copied when an application, associated with the flow, is identified. In this way, network device 210 may conserve computing resources (e.g., processing resources, memory resources, etc.) that would otherwise be wasted if packets continued to be copied after the application is identified.

Additionally, or alternatively, network device 210 may copy a particular quantity of packets associated with a flow (e.g., a particular quantity of initial packets received for the flow). The quantity of packets to be copied may be configurable, and network device 210 may receive information that identifies the quantity of packets to be copied (e.g., 5 packets, 10 packets, 15 packets, etc.). For example, network device 210 may copy the first ten packets of a flow because an application, associated with the flow, may be identifiable based on the first ten packets of the flow. In this way, network device 210 may conserve computing resources compared to copying all packets for a flow. For example, in some cases, network device 210 may be unable to identify an application associated with a flow. In these cases, if network device 210 continues to copy packets until an application is identified, then network device 210 may copy a large quantity of packets for the flow, thereby wasting computing resources. By limiting copying of packets to a particular quantity, network device 210 may conserve these computing resources.

As further shown in FIG. 4, process 400 may include determining that network traffic, associated with the application, is not to be protected using IPsec (block 440). For example, network device 210 may determine whether network traffic, associated with the identified application, is not to be protected using IPsec (e.g., is not to be authenticated, encrypted, etc. using IPsec). In some implementations, network device 210 may compare an application identifier, which identifies the application, to a list of application identifiers to determine whether to protect network traffic of the application using IPsec. In some implementations, the list of application identifiers may identify applications that are to be protected using IPsec. In some implementations, the list of application identifiers may identify applications that are not to be protected using IPsec.

For example, assume that the list of application identifiers identifies applications that are not to be protected using IPsec (e.g., when the list is an "IPsec-Skip-List"). In this case, network device 210 may compare the application identifier to the list of application identifiers, and may determine not to protect network traffic of the application if the application identifier is included in the list of application identifiers (e.g., if the application identifier matches an application identifier included in the list). By including, in the list of application identifiers, application identifiers for applications that are not to be protected using IPsec (e.g., that are to be transmitted unencrypted), network device 210 may protect network traffic using IPsec by default, thereby increasing network security.

In some implementations, the list of application identifiers may be stored by network device 210. Additionally, or alternatively, the list of application identifiers may be stored by another device, and may be accessible by network device 210. For example, network device 210 may transmit an application identifier to a device that stores the list. The device may determine whether the application identifier is included in the list (e.g., using a table lookup), and may provide a message, to network device 210, that indicates whether the application identifier is included in the list (e.g., that indicates whether the application is to be protected using IPsec).

If the application identifier is not included in the list, then network device 210 may continue to protect network traffic, associated with the application, using IPsec (e.g., may continue to protect network traffic when protecting network traffic by default). If the application identifier is included in the list, then network device 210 may store a rule that indicates not to protect network traffic of the application using IPsec, and may transmit a message to peer device 240 indicating that network traffic of the application is to be accepted and/or transmitting without IPsec protection, as described in more detail below.

As further shown in FIG. 4, process 400 may include storing a rule that indicates that network traffic, associated with the flow, is not to be protected using IPsec (block 450). For example, network device 210 may store a rule (e.g., in security policy database 220) indicating that network traffic associated with the flow (e.g., the flow associated with the application) is not to be protected using IPsec. In other words, network device 210 may store a rule indicating that network traffic of the application is to be transmitted unencrypted.

In some implementations, the rule may identify network layer information and/or transport layer information associated with the flow (e.g., a source IP address, a destination IP address, a source port, a destination port, a protocol, etc.) because IPsec uses network layer information and/or transport layer information to apply IPsec policies. In this case, network device 210 may determine the network layer information and/or transport layer information associated with the application that is not to be protected using IPsec (e.g., based on the flow associated with the application), and may use this network layer information and/or transport layer information to create the rule. The rule may indicate that network traffic associated with particular network layer information and/or transport layer information is not to be protected using IPsec (e.g., is to be transmitted unencrypted, using cleartext, using a different form of secure transmission, etc.). In this way, network device 210 may permit IPsec policies to be applied based on application layer information (e.g., by identifying network layer information and/or transport layer information corresponding to the application layer information).

In some implementations, a new rule, indicating that network traffic is not to be protected using IPsec, may be stored to override and/or take precedence over an old rule indicating that network traffic is to be protected using IPsec. For example, assume that an old rule indicates that flows from a source IP address of 1.2.3.4 to a destination IP address of 5.6.7.8 are to be protected using IPsec. Further, assume that network device 210 determines that a particular application, associated with network traffic being transmitted from this source IP address to this destination IP address, is not to be protected using IPsec. Using deep packet inspection, network device 210 determines that the application is associated with a source port of 10 and a destination port of 10. In this case, network device 210 may store a new rule indicating that flows from source port 10 of source IP address of 1.2.3.4 to destination port 10 of destination IP address of 5.6.7.8 are not to be protected using IPsec. This new rule may take precedence over the old rule (e.g., may be processed instead of the old rule) when determining whether to protect network traffic using IPsec. Additionally, or alternatively, the old rule may be modified based on the new rule. In this way, additional network traffic, received after storing the new rule, may be transmitted without applying IPsec protection.

As further shown in FIG. 4, process 400 may include transmitting, to a peer device, a message indicating that network traffic, associated with the flow, is not to be protected using IPsec (block 460). For example, network device 210 may transmit, to peer device 240, a message indicating that network traffic associated with the flow (e.g., the flow associated with the application) is not to be protected using IPsec.

In some implementations, the message may instruct peer device 240 to accept network traffic for the flow, from network device 210, without IPsec protection (e.g., by informing peer device 240 that network device 210 will transmit network traffic of the flow without IPsec protection). For example, the message may inform peer device 240 that network traffic for the flow will be sent unencrypted, so that peer device 240 does not need to decrypt network traffic for the flow upon receipt.

Additionally, or alternatively, the message may instruct peer device 240 to transmit network traffic for the flow, to network device 210, without using IPsec protection. For example, the message may inform peer device 240 that network traffic for the flow does not need to be encrypted, so that peer device 240 does not need to encrypt network traffic for the flow prior to sending the network traffic to network device 210.

In some implementations, based on the message, peer device 240 may update a security policy database 220 associated with peer device 240. For example, peer device 240 may store a rule that indicates that network traffic of the flow is not to be protected using IPsec, in a similar manner as described elsewhere herein. Additionally, or alternatively, peer device 240 may forward the message to one or more other network devices 210 and/or peer devices 240 (e.g., along a network path toward a destination of the network traffic). In some implementations, the message from network device 210 may indicate whether peer device 240 is to forward the message to other network devices 210 and/or peer devices 240.

In some implementations, the message may include an Internet Key Exchange (IKE) message. Peer device 240 may receive the message, and may modify security policy database 220 and/or an access control list, associated with peer device 240, based on the message. In some implementations, the IKE message may be encrypted using IPsec, thereby increasing network security.

As further shown in FIG. 4, process 400 may include transmitting network traffic, associated with the flow, without using IPsec protection (block 470). For example, after storing the rule, network device 210 may transmit network traffic, associated with the flow, without using IPsec protection. In some implementations, network device 210 may transmit unencrypted (e.g., cleartext) network traffic associated with the flow (e.g., associated with the application). For example, network device 210 may transmit unencrypted network traffic to peer device 240. Based on a previous message received from network device 210 (e.g., indicating that the network traffic is being transmitted unencrypted), peer device 240 may properly process the unencrypted network traffic (e.g., may not attempt to decrypt the network traffic).

In this way, network device 210 may provide application-specific IPsec protection to network traffic. For example, network device 210 may encrypt a first flow associated with a first application that requires a high level of security, and may not encrypt a second flow associated with a second application that does not require a high level of security. In this way, network device 210 may provide increased security for applications that require a high level of security, while increasing network performance and conserving processing resources for applications that do not require a high level of security (e.g., by eliminating processing associated with providing IPsec protection for these applications).

In some cases, an application may employ dynamic port selection, where a port via which network traffic associated with the application is to be transmitted is not known prior to transmitting the network traffic. Because IPsec policies use network layer information and/or transport layer information to determine whether to apply IPsec protection to network traffic, IPsec cannot differentiate between applications at the network layer or the transport layer, and cannot be configured regarding whether to apply IPsec protection when an application employs dynamic port selection. Implementations described herein permit such differentiation between applications, even in the case where an application employs dynamic port selection.

Furthermore, implementations described herein do not require separate security associations to be created and/or stored for individual applications, which may be required if IPsec were to be modified to directly operate on application layer information. For example, implementations described herein permit multiple applications, communicated between the same endpoint devices, to share a common security association. If IPsec policies were application-specific (e.g., if rules were stored that use application identifiers), each application may require a separate security association. By using network layer information and/or transport layer information for IPsec, where the network layer information and/or transport layer information corresponds to an application for which IPsec is not to be used, implementations described herein may share security associations among multiple applications, thereby conserving computing resources. Furthermore, implementations described herein are compatible with IPsec, which increases the likelihood of successful communications between devices that utilize IPsec.

While some implementations are described herein in connection with IPsec, other implementations may be employed in connection with another security protocol (e.g., other than IPsec). For example, implementations described herein may be applied to a security protocol (e.g., an encryption protocol) that controls whether network traffic is authenticated, encrypted, or the like. Additionally, or alternatively, implementations described herein may apply to another type of security protocol that operates at the network layer or the transport layer (e.g., a network layer security protocol and/or a transport layer security protocol that uses network layer information and/or transport layer information to determine whether to encrypt network traffic).

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

Implementations described herein permit IPsec policies to be used to protect network traffic based on application layer information. In this way, the security of the network traffic may be increased via the use of IPsec, while also permitting more control over the type of network traffic that is protected. This provides increased security for more sensitive applications, and also conserves computing resources (e.g., processing resources, memory resources, etc.) and increases network performance (e.g., throughput, latency, etc.) for less sensitive applications.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A device, comprising:
one or more processors, at least partially implemented in hardware, to:
receive one or more packets associated with a network traffic flow,
the network traffic flow including parameters related to at least one of:
a network layer information, or
a transport layer information;
determine to protect the one or more packets, associated with the network traffic flow, using Internet protocol security (IPsec) based upon the parameters related to the at least one of the network layer information or the transport layer information;
identify an application associated with the network traffic flow;
compare the application to a list of stored applications to determine if the application is not required to be protected using IPsec;
determine to not protect network traffic, associated with the application, using IPsec after determining to protect the one or more packets using IPsec;
store a rule that indicates that the network traffic, associated with the network traffic flow, is not to be protected using IPsec based on determining that the network traffic is not to be protected using IPsec;
transmit, to another device, a message indicating that the network traffic, associated with the network traffic flow, is not to be protected using IPsec based on determining that the network traffic is not to be protected using IPsec; and
transmit, to the other device, the network traffic, associated with the network traffic flow, without using IPsec protection.

2. The device of claim 1, where the one or more processors, when determining that the network traffic is not to be protected using IPsec, are to:

determine an application identifier that identifies the application;
compare the application identifier to a list of stored application identifiers; and
determine that the network traffic is not to be protected using IPsec based on comparing the application identifier to the list of stored application identifiers.

3. The device of claim 1, where the one or more processors, when identifying the application, are to:
identify the application using application layer information associated with the network traffic; and
where the one or more processors, when storing the rule, are to:
store, as part of the rule, network layer information or transport layer information that identifies the network traffic flow,
the network layer information or the transport layer information corresponding to and not including the application layer information.

4. The device of claim 1, where the one or more processors, when determining that the network traffic is not to be protected using IPsec, are to:
determine that the network traffic is to be transmitted unencrypted;
where the one or more processors, when storing the rule, are to:
store, as part of the rule, an indication that the network traffic is to be transmitted unencrypted; and
where the one or more processors, when transmitting the network traffic, are to:
transmit the network traffic unencrypted.

5. The device of claim 1, where the one or more processors, when storing the rule, are to:
determine network layer information or transport layer information associated with the application; and
store the rule,
the rule indicating that packets that include the network layer information or the transport layer information are not to be protected using IPsec.

6. The device of claim 1, where the one or more processors, when transmitting the message, are to:
transmit information that indicates that the network traffic will be transmitted unencrypted.

7. The device of claim 1, where the one or more processors, when transmitting the message, are to:
transmit an instruction not to encrypt the network traffic.

8. A non-transitory computer-readable medium storing instructions, the instructions comprising:
one or more instructions that, when executed by one or more processors, cause the one or more processors to:
receive one or more packets associated with a network traffic flow,
the network traffic flow including parameters related to at least one of:
a network layer information, or
a transport layer information;
determine to protect the one or more packets, associated with the network traffic flow, using a network security protocol based upon the parameters related to the at least one of the network layer information or the transport layer information
determine application layer information included in the one or more packets;
identify, based on the application layer information, an application associated with the network traffic flow;
compare the application to a list of stored applications to determine if the application is not required to be protected using the network security protocol;
determine that network traffic, associated with the application, is not to be protected using the network security protocol;
store a rule that indicates that the network traffic is not to be protected using the network security protocol based on determining that the network traffic is not to be protected using the network security protocol,
the rule including network layer information and/or transport layer information that identifies the network traffic flow, and
the rule not including the application layer information; and
transmit, based on the rule, the network traffic without using the network security protocol to protect the network traffic.

9. The non-transitory computer-readable medium of claim 8, where the network security protocol is Internet protocol security (IPsec).

10. The non-transitory computer-readable medium of claim 8, where the one or more instructions, when executed by the one or more processors, further cause the one or more processors to:
transmit a message indicating that the network traffic is not to be protected using the network security protocol based on determining that the network traffic is not to be protected using the network security protocol.

11. The non-transitory computer-readable medium of claim 10, where the message includes an Internet key exchange (IKE) message.

12. The non-transitory computer-readable medium of claim 8, where the network layer information and/or the transport layer information, included in the rule, corresponds to the application layer information associated with the application.

13. The non-transitory computer-readable medium of claim 8, where the one or more instructions, that cause the one or more processors to determine the application layer information, cause the one or more processors to:
copy a configured quantity of the one or more packets to create one or more copied packets;
analyze the one or more copied packets; and
determine the application layer information, included in the one or more packets, based on analyzing the one or more copied packets.

14. A method, comprising:
receiving, by a network device, a packet flow,
the packet flow including parameters related to at least one of:
a network layer information, or
a transport layer information;
determining, by the network device, to protect the packet flow using a security protocol based upon the parameters related to the at least one of the network layer information or the transport layer information;
identifying, by the network device, an application associated with the packet flow;
comparing, by the network device, the application to a list of stored applications to determine if the application is not required to be protected the security protocol;
determining, by the network device, that packets associated with the application are not to be encrypted using the security protocol;
storing, by the network device, a rule that indicates that the packets are not to be encrypted using the security protocol based on determining that the packets are not to be encrypted using the security protocol,
 the rule including network layer information or transport layer information associated with the packet flow, and
 the rule excluding application layer information associated with the packet flow; and
transmitting, by the network device and based on the rule, the packets without using the security protocol to encrypt the packets.

15. The method of claim 14, further comprising:
transmitting, to another device, a message that indicates that the packets are to be accepted without using the security protocol to decrypt the packets.

16. The method of claim 14, further comprising:
transmitting, to another device, a message that indicates that network traffic associated with the network layer information or the transport layer information is to be transmitted without using the security protocol to encrypt the packets.

17. The method of claim 14, where the security protocol uses the network layer information or the transport layer information, and not the application layer information, to determine whether to encrypt the packets.

18. The method of claim 14, where determining that the packets associated with the application are not to be encrypted using the security protocol comprises:
 determining an application identifier associated with the application;
 comparing the application identifier and a list of stored application identifiers,
  the list of stored application identifiers including one or more application identifiers corresponding to one or more applications for which network traffic is not to be encrypted using the security protocol; and
 determining that the packets associated with the application are not to be encrypted using the security protocol based on comparing the application identifier and the list of stored application identifiers.

19. The method of claim 14, where storing the rule comprises:
 storing the rule in a security policy database that stores Internet protocol security (IPsec) policies.

20. The device of claim 1, where the message includes an Internet key exchange (IKE) message.

\* \* \* \* \*